United States Patent [19]
Dolikian

[11] 4,231,114
[45] Oct. 28, 1980

[54] SYNCHRONIZING MEANS FOR A TWO-WAY COMMUNICATION SYSTEM

[75] Inventor: Arman V. Dolikian, Palatine, Ill.

[73] Assignee: Motorola, Inc., Schaumburg, Ill.

[21] Appl. No.: 881,307

[22] Filed: Feb. 27, 1978

[51] Int. Cl.³ .............................................. H04B 1/50
[52] U.S. Cl. ..................................... 455/49; 455/53; 455/54; 455/57; 375/107
[58] Field of Search .................. 325/4, 5, 6, 7, 17, 325/20, 31, 51, 53, 54, 58, 63; 343/179; 178/69.1

[56] References Cited
U.S. PATENT DOCUMENTS

| | | | |
|---|---|---|---|
| 3,413,554 | 11/1968 | Yates | 325/17 |
| 3,424,864 | 1/1969 | Williams | 325/58 |
| 3,646,444 | 2/1972 | Bitzer | 325/58 |
| 3,758,720 | 9/1973 | Dinn | 325/58 |
| 3,927,373 | 12/1975 | Janssens | 325/58 |
| 4,019,138 | 4/1977 | Watanabe | 325/17 |
| 4,061,974 | 12/1977 | Fletcher | 325/58 |

*Primary Examiner*—Robert L. Griffin
*Assistant Examiner*—Michael Allen Masinick
*Attorney, Agent, or Firm*—James A. Scheer; James W. Gillman; James P. Hamley

[57] ABSTRACT

Digitally encoded data is carried over a first channel between a base station and a plurality of mobiles with the mobiles sharing a second channel for transmission to the base on a contention basis. Proper decoding of the data requires clock syncing at the receiver site.

To hasten clock recovery lock time at the base station and improve system throughput, each mobile includes apparatus for monitoring transmissions by the base station and deriving a transmit clock base for the mobile's transmitter therefrom such that subsequent transmissions by the mobiles are all substantially in synchronization.

5 Claims, 3 Drawing Figures

U.S. Patent     Oct. 28, 1980     4,231,114
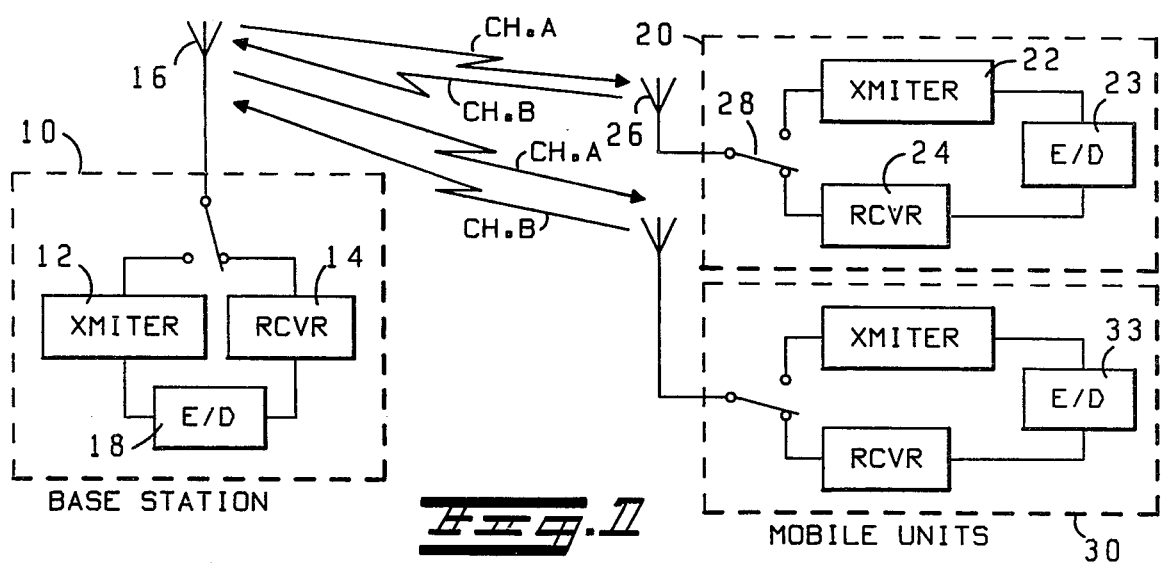
*Fig. 1*
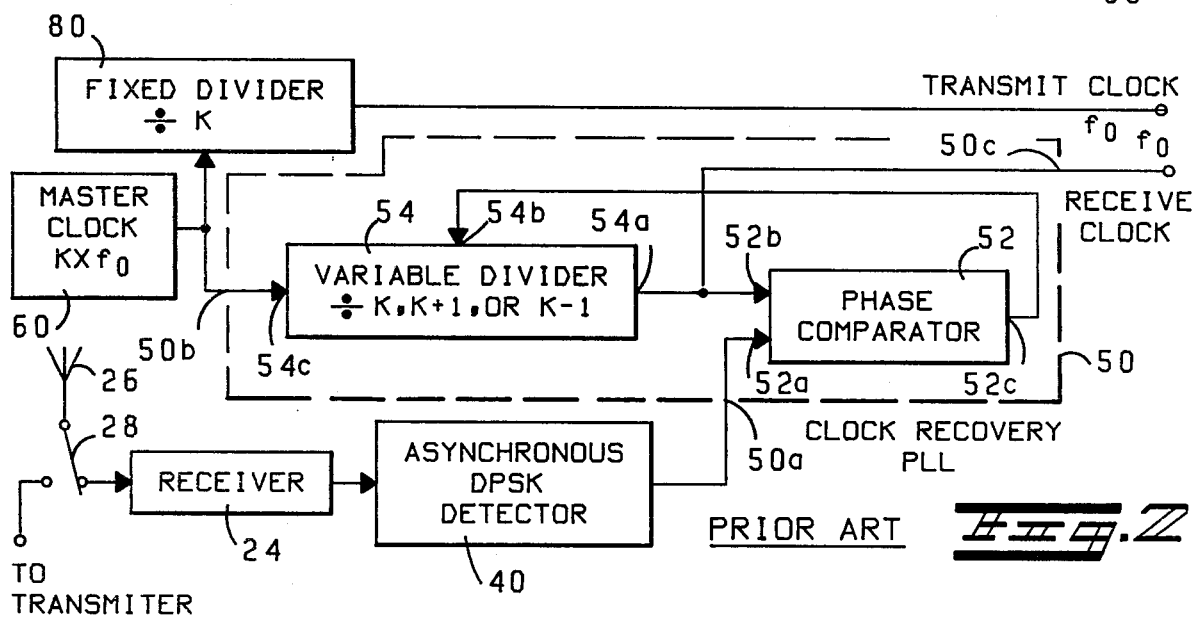
PRIOR ART    *Fig. 2*
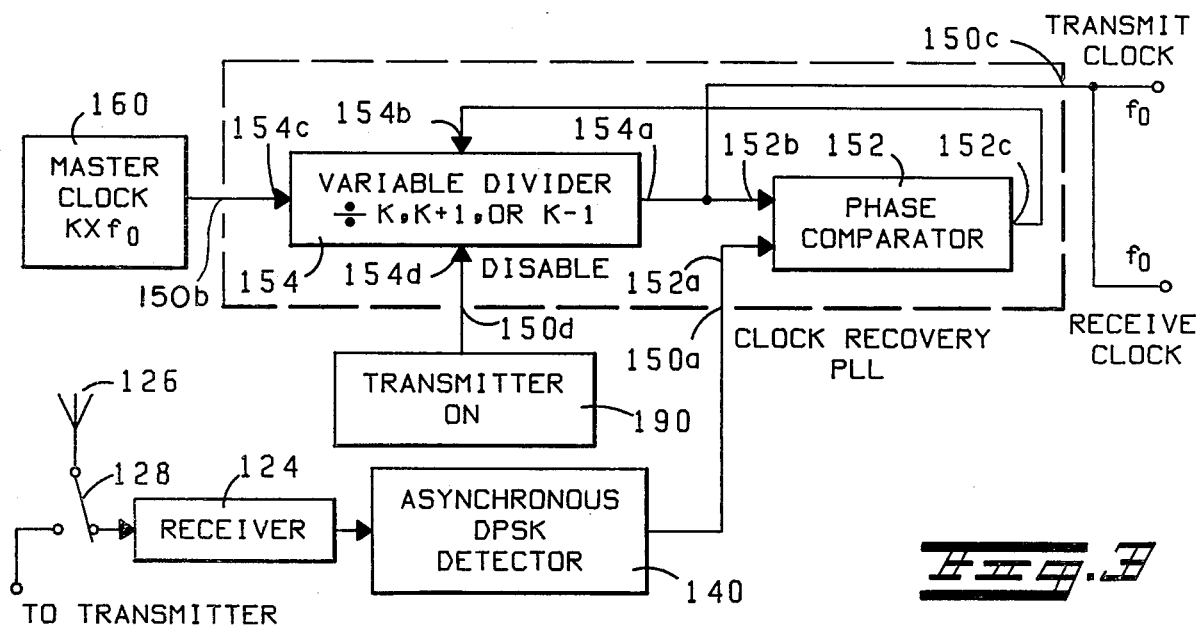
*Fig. 3*

SYNCHRONIZING MEANS FOR A TWO-WAY COMMUNICATION SYSTEM

BACKGROUND OF THE INVENTION

The present invention pertains to the radio communication art and, more particularly, to a means for synchronizing transmissions from a plurality of sites.

The present invention finds particular application in a mobile two-way communication system, such as is shown in FIG. 1. Here, a base station 10, which includes a transmitter 12 and a receiver 14 transmits and receives over an antenna 16. The base station 10 transmits to a plurality of mobiles, two of which are shown at 20, 30. Each mobile, such as mobile 20, is comprised of a transmitter 22, a receiver 24, an antenna 26 and a transmit-receiver antenna switch 28.

In a particular two-way system, transmissions from the base station 10 to the mobiles are carried over a first channel, channel A, whereas transmissions from the mobiles to the base stations are carried on a second channel, channel B. The mobiles 20, 30 share channel B on a contention basis. This means that a mobile requesting transmission on a given channel will be allowed to transmit immediately if the channel is free, but will have to wait until the channel is free if the channel is already in use.

In many applications, the information signals communicated between the base station and the mobiles are encoded. Thus, the encoded information may be scrambled speech, digital data, and so forth. In the preferred embodiment of the instant invention, the encoding process is comprised of differential phase shift keying of digital data. Encoding and decoding of the data is accomplished at the base by an encoder/decoder 18 and in the mobiles 20, 30 by encoder/decoders 23, 33, respectively.

Encoding schemes for digital data generally include using an encoding rate determined by a transmit clock time base. Thus, proper decoding of an encoded transmission requires recovery of the clock transmit time base.

FIG. 2 is a block diagram of a conventional clock recovery and transmit time base system as may be found in mobile stations, such as mobile 20, according to the prior art. Here, a transmission from the base 10 over channel A is picked up by antenna 26 and routed via antenna switch 28 to the receiver 24. For transmissions which have been differentially phase shifted keyed, the output from receiver 24 is passed through an asynchronous detector 40, of conventional design, which waveshapes the received data in preparation for data recovery.

The output from the asynchronous digital phase shift key detector 40 is applied to one input 50a of a clock recovery phase lock loop 50. Clock recovery phase lock loop 50 is comprised of a conventional phase comparator 52 and a variable frequency divider 54. Phase detector 52 includes first and second inputs of 52a, 52b for receiving two input signals and an output 52c for producing an error signal representative of the phase difference of the signals applied at its inputs 52a, 52b. The first input 52a of phase comparator 52 is connected to the first input 50a of the clock recovery phase lock loop 50. The second input 52b of phase comparator 52 is connected to the output 54a of the variable divider 54. Variable divider 54 responds to signals at its control input 54b to divide signals applied at its input 54c by one of three divisors, i.e. k, k+1 or k−1. The error output signal appearing at the phase comparator output 52c is fed back to the control input 54b of variable divider 54.

A master clock oscillator 60 is provided which produces an output signal of frequency k×fo, where k is a selected integer. The output from the master clock oscillator feeds to the input 54c of the divider 54 through the second input 50b of the clock recovery phase lock loop 50. The output 50c of the clock recovery phase lock loop is taken from the output 54a of the variable divider 54.

In operation, the phase comparator compares the divided master clock oscillator signal to the output from the asynchronous DPSK detector and produces an output error signal at its output 52c which, when coupled back to the control input 54b of the variable divider 54 tends to phase lock the master clock signal to the output from the asynchronous detector 40. Thus, the signal appearing at the clock recovery phase lock loop output 50c is at frequency fo and it is synchronized to the transmit time base clock. Hence, it may then be used in the conventional manner to fully decode the encoded transmission.

For transmission by the mobile 20, the antenna relay 28 couples the antenna 26 to the transmitter 22 (FIG. 1) and the master clock 60 through a second fixed divider 80, of fixed divisor k, provides the transmit clock frequency fo. The data at the mobile is then encoded and transmitted over channel B to the base station 10 where it is then decoded by encoder/decoder 18 (FIG. 1). As with the mobile station, proper decoding by the base requires recovering the time base clock of the transmission.

A substantial problem with two-way communication systems, such as that shown in the prior art, is that synchronization at the receiving site must be established before the information transmitted can be recovered. The synchronization period often requires a substantial length of time, thus resulting in reduced efficiency and throughput.

SUMMARY OF THE INVENTION

It is an object of this invention, therefore, to provide a means for minimizing synchronization time in two-way encoded communication systems.

Briefly, the invention finds application in a radio communication system having a plurality of stations. Each station is comprised of a transmitter and a receiver which transmit and receive over provided channels. Proper reception of a transmission requires synchronization of the receiver to the transmitted signal. The improvement in such a station comprises transmitter synchronizing apparatus which monitors transmissions on one of the transmission channels and synchronizes its transmitter thereto. Thus, a subsequent transmission by the station is substantially synchronized to a previous transmission on the monitor channel.

BRIEF DESCRIPTION OF THE DRAWINGS

FIG. 1 is a generalized drawing of a two-way mobile communication system;

FIG. 2 is a block diagram of the asynchronous transmit and receive clock system according to the prior art; and FIG. 3 is a block diagram illustrating the preferred embodiment of the synchronizing system according to the invention.

DETAILED DESCRIPTION OF THE PREFERRED EMBODIMENT OF THE INVENTION

The preferred construction of the synchronizing apparatus according to the invention is shown in FIG. 3. Here, paralleling FIG. 2, transmissions are received or transmitted over an antenna 126 which couples through an antenna switch 128 to either a receiver 124 or a transmitter (not shown). In the receive mode, the output from the receiver is passed through the asynchronous differential phase shift keyed detector 140. Antenna 126, antenna switch 128, receiver 124 and asynchronous digital phase shift keyed detector 140 are identical to the corresponding apparatus shown in FIG. 2.

The output from the asynchronous detector 140 feeds to the first input 150a of a clock recovery phase locked loop 150. The second input 150b of clock recovery phase locked loop 150 is coupled to the output of a master clock oscillator 160 which produces an output signal of frequency k×fo, where, as before, k is a predetermined integer and fo is the frequency of the transmit time base.

As with the clock recovery phase lock loop of FIG. 2, a phase comparator 152 is comprised of inputs 152a, b and an output 152c. The first input 152a of the phase comparator 152 is coupled to the first input 150a of the clock recovery phase lock loop 150. The output 152c from the phase comparator 152 is connected to the control input 154b of a variable frequency divider 154. Variable divider 154 has a provided input 154c to which are applied master clock signals from master clock oscillator 160 via the second phase lock loop input 150b. The output 154a of the variable divider 154 is connected to the second input 152b of phase comparator 152.

As with the system shown in FIG. 2, the signal appearing at the clock recovery phase locked loop output 150c is at the frequency fo, phase locked, or synchronized to the output from the asynchronous detector 140. However, unlike the phase locked loop shown in FIG. 2, a disable or inhibit input 150d is provided which locks the divisor of variable divider 154 to k via the divider's inhibit input 154d. Upon receiving a disable signal at its input 150d, the clock recovery phase locked loop 150 continues to produce an output signal at the frequency fo. However, in the disable mode, the phase lock loop 150 does not respond to the asynchronous detector 140. Thus, the signal appearing at the clock recovery output 150c remains substantially at that phase relationship established prior to reception of the disable signal at the disable input 150d.

The disable signal is generated upon the mobile's transmitter being activated, as is indicated by block 190. The output from the clock recovery phase locked loop 150, which is of frequency fo, is used both as the transmit and the receive clock time base.

In operation, in the receive mode the system of FIG. 3 synchronizes to the time base of the base station's transmit clock. Upon activation of the mobile to the transmit mode, the clock recovery phase locked loop receives a disable level at its output which is used as the time base for the transmit clock. Since the mobile's time base signal is substantially in synchronization with the time base of the base station transmit clock, and since other mobiles utilize the same synchronizing system, transmissions to the base stations are all substantially in synchronization. Upon conclusion of the transmission, the disable signal is removed from disable input 150d and the system resumes operation as before. In this manner, clock recovery time at the base station may be kept an absolute minimum, thereby increasing system efficiency and enhancing overall system throughput time.

While the preferred embodiment of the invention has been described in detail, it should be apparent that many modifications and variations thereto are possible, all of which fall within the true spirit and scope of the invention.

I claim:

1. In a two-way communication system comprised of a base station and a plurality of mobile stations wherein the base station transmits to all mobiles over a first channel and the mobile stations transmit to the base station over a second channel and wherein the information carried by each transmission is encoded using a predetermined transmit clock signal, with proper decoding of each transmission requiring phase synchronization to said transmit clock signal, the improvement in a mobile station comprising:
   a master oscillator for producing a signal of frequency $kf_o$ at an output where k is a predetermined integer;
   detector means for preparing said base station transmissions for decoding, and coupling a prepared signal to an output;
   a clock recovery means, being coupled to the outputs from the master oscillator and the detector means, for producing a receiver clock signal which is phase locked to said prepared signal; and
   means for utilizing the clock recovery means receiver clock signal as the transmit clock time base for an encoded transmission by said mobile station such that the transmission by said mobile station over said second channel is substantially synchronized to the base station transmission over the first channel.

2. The improvement of claim 1 wherein the receiver clock signal is also utilized by the receiver of said mobile station for decoding transmissions from said base station.

3. The improvement of claim 1 wherein said means for utilizing further comprises means operable during transmission by said mobile station for inhibiting the phase locking action of the clock recovery means.

4. In a radio communication system wherein a plurality of stations, each having a transmitter and a receiver, transmit and receive over provided channels, and wherein information signals are encoded at a clock frequency $f_o$ for transmission over a channel, each station having a master oscillator for producing a signal of frequency $kf_o$, where k is a predetermined integer, and having a detector for preparing received transmissions for decoding, the improvement in a station comprising:
   clock recovery means, coupled to the master oscillator and the detector, for producing an output signal which is phase locked to said prepared signal; and
   means for utilizing the output signal of said clock recovery means as a transmitter encoding clock signal 5. The improvement of claim 4 wherein said means for utilizing further comprises means operable during transmission by said station to inhibit the phase locking action of the clock recovery means.

* * * * *